United States Patent
Ihara et al.

(10) Patent No.: US 7,190,274 B2
(45) Date of Patent: Mar. 13, 2007

(54) CONSCIOUSNESS JUDGING APPARATUS

(75) Inventors: Toru Ihara, Tokyo (JP); Keiichi Yamamoto, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 159 days.

(21) Appl. No.: 11/091,230

(22) Filed: Mar. 28, 2005

(65) Prior Publication Data
US 2005/0219057 A1 Oct. 6, 2005

(30) Foreign Application Priority Data
Mar. 30, 2004 (JP) ............... 2004-100660

(51) Int. Cl.
*G08B 23/00* (2006.01)
*B60Q 1/00* (2006.01)
*H04N 7/18* (2006.01)
*G06K 9/00* (2006.01)
*G06K 9/34* (2006.01)
*G05D 1/02* (2006.01)

(52) U.S. Cl. .................. 340/575; 340/439; 340/576; 348/113; 348/143; 348/148; 382/104; 382/173; 701/1; 701/300; 701/301

(58) Field of Classification Search ............. 340/439, 340/435–436, 575–576; 348/113, 143, 148; 382/104, 173; 701/1, 300–301
See application file for complete search history.

(56) References Cited

U.S. PATENT DOCUMENTS 4,496,938 A * 1/1985 Seko et al. .................. 340/576
5,648,755 A * 7/1997 Yagihashi .................... 340/439
5,694,116 A * 12/1997 Kojima ....................... 340/576

(Continued)

FOREIGN PATENT DOCUMENTS

JP            2830475 B2       9/1998

(Continued)

OTHER PUBLICATIONS

Kitajima, H. et al., "Prediction of Automobile Driver Sleepiness," Transactions of the Japan Society of Mechanical Engineers, Sep. 1997, No. 96-1780, pp. 93-100. (see spec.).

(Continued)

*Primary Examiner*—Daniel Wu
*Assistant Examiner*—Lam Pham
(74) *Attorney, Agent, or Firm*—Rossi, Kimms & McDowell LLP

(57) ABSTRACT

A consciousness judging apparatus, which detects a vehicle driving state and judges consciousness of a driver, comprising a monotonousness detection section to obtain monotonousness, a camera which captures an image of a road surface in the vehicle running direction, a meander quantity detection section which detects the meander quantity based on the road surface image taken by the camera, a correction section which corrects and increases the monotonousness when the meander quantity detected this time by the meander quantity detection section is larger than the meander quantity detected last time by the meander quantity detection section by the value greater than a predetermined value $\alpha$, and a fuzzy inference section which infers a driver's consciousness based on the monotonousness corrected by the correction section and meander quantity.

9 Claims, 11 Drawing Sheets

U.S. PATENT DOCUMENTS

| | | | |
|---|---|---|---|
| 5,745,031 A * | 4/1998 | Yamamoto | 340/439 |
| 5,815,070 A * | 9/1998 | Yoshikawa | 340/439 |
| 6,023,227 A * | 2/2000 | Yanko et al. | 340/576 |
| 6,218,947 B1 * | 4/2001 | Sutherland | 340/576 |
| 6,366,207 B1 * | 4/2002 | Murphy | 340/576 |
| 6,831,591 B2 | 12/2004 | Horibe | |
| 6,845,172 B2 | 1/2005 | Furusho | |
| 6,879,890 B2 | 4/2005 | Matsumoto et al. | |
| 6,925,206 B2 | 8/2005 | Akutagawa | |
| 6,950,027 B2 * | 9/2005 | Banas | 340/576 |
| 6,973,380 B2 | 12/2005 | Tange et al. | |
| 7,006,667 B2 | 2/2006 | Akutagawa | |
| 7,054,723 B2 * | 5/2006 | Seto et al. | 701/1 |
| 7,084,772 B2 | 8/2006 | Oyama | |

FOREIGN PATENT DOCUMENTS

JP        3039327 B2        3/2000

OTHER PUBLICATIONS

Specification and claims of related co-pending U.S. Appl. No. 11/076,435.

Specification and claims of related co-pending U.S. Appl. No. 11/084,720.

Specification and claims of related co-pending U.S. Appl. No. 11/091,358.

* cited by examiner

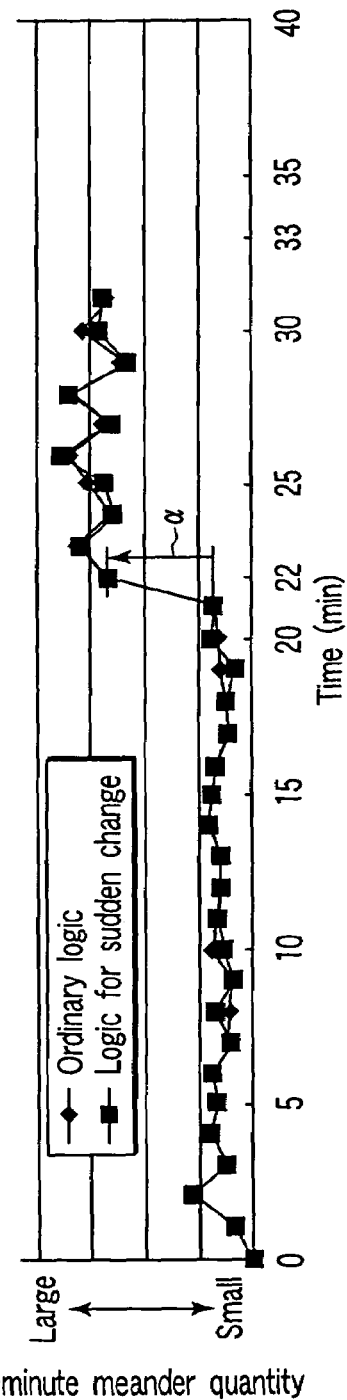
F I G. 8A
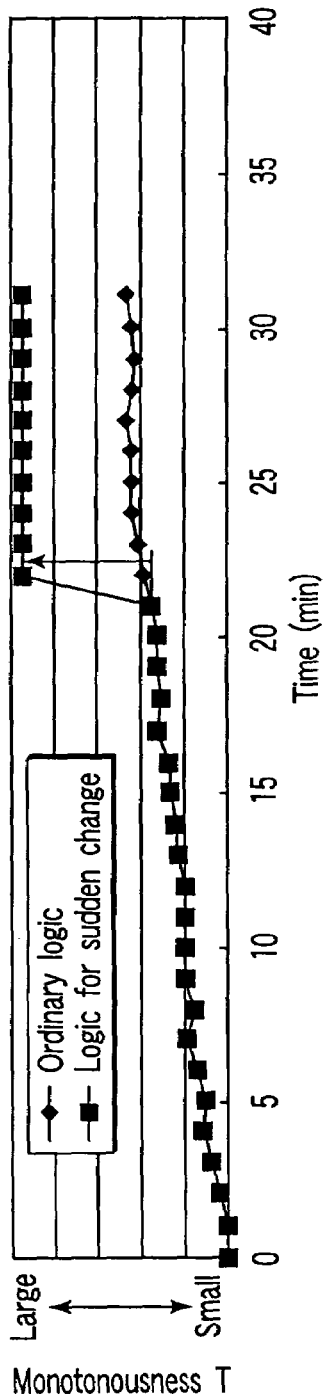
F I G. 8B
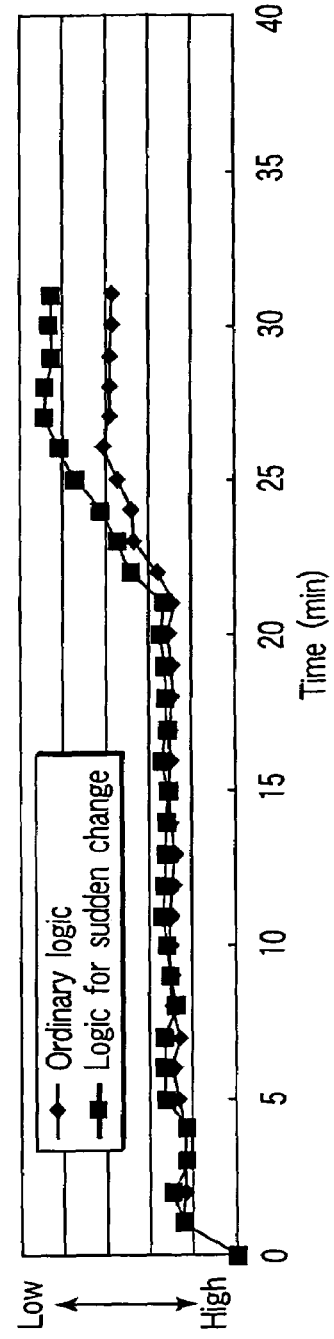
F I G. 8C

CONSCIOUSNESS JUDGING APPARATUS

CROSS-REFERENCE TO RELATED APPLICATIONS

This application is based upon and claims the benefit of priority from prior Japanese Patent Application No. 2004-100660, filed Mar. 30, 2004, the entire contents of which are incorporated herein by reference.

BACKGROUND OF THE INVENTION

1. Field of the Invention

The present invention relates to a consciousness judging apparatus which can exactly detect a drop in consciousness (concentration) of a driver caused by sudden drowsiness while driving a vehicle.

2. Description of the Related Art

An automobile has various means operated by a driver, such as a steering wheel, an accelerator, a brake pedal, a gear-shift lever, a winker lever, a wiper switch, and a light switch.

When the number of operations of these operation means is decreased, driving becomes monotonous and the driver becomes drowsy and may fall asleep during driving.

It is known that the consciousness level is reduced while changing periodically (25–251 sec) until a driver falls asleep (refer to Theses of Mechanics Society of Japan, September, 1997).

There is a known apparatus, which infers a driver's consciousness (concentration) by inputting the data output from each operation means into a fuzzy inference means after averaging at every certain time (5 minutes, for example) (refer to U.S. Pat. No. 3,039,327).

There is another known apparatus, which infers a driver's consciousness (concentration) considering the individual driving characteristics of the driver, by inputting the average value of meander quantity in the initial driving operation as a reference value (refer to U.S. Pat. No. 2,830,475).

However, in the apparatus of the above U.S. Pat. No. 3,039,327, the data input to the fuzzy inference means is the average of 5-minute data.

In the apparatus of U.S. Pat. No. 2,830,475, the data input to the fuzzy inference means is the average of 10-minute data.

A driver may suddenly become drowsy before the above certain time, for example, 5 minutes. For example, there is a case that consciousness (concentration) is suddenly lowered by drowsiness in about 1 minute.

In such a case, as disclosed by U.S. Pat. No. 3,039,327, the data input to the fuzzy inference means is the average value of the detection time set relatively longer. Thus, the traceability of estimating concentration may be lowered for the sudden drop of consciousness (concentration) caused by sudden drowsiness.

BRIEF SUMMARY OF THE INVENTION

It is an object of the present invention is to provide a consciousness judging apparatus which can judge a drop of consciousness (concentration) of a driver caused by sudden drowsiness.

According to one aspect of the present invention, there is provided a consciousness judging apparatus, which detects a vehicle driving state and judges consciousness of a driver, comprising a monotonousness detection section configured to obtain monotonousness; an image pickup unit configured to capture an image of a road surface in the vehicle running direction; a meander quantity detection section configured to detect the meander quantity based on the road surface image captured by the image pickup unit; a correction section configured to correct and increases the monotonousness when the meander quantity detected this time by the meander quantity detection section is larger than the meander quantity detected last time by the meander quantity detection section by the value greater than a predetermined value; and a fuzzy inference section configured to infer a driver's consciousness based on the monotonousness corrected by the correction section and meander quantity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 8A to 8C show graphs for explaining the operation of the first embodiment;

DETAILED DESCRIPTION OF THE INVENTION

Hereinafter an embodiment of the present invention will be explained with reference to the accompanying drawings. An asleep-at-the-wheel warning apparatus S1 has a camera 2 provided in the front part of a not-shown cabin for capturing an image of a front road surface 1 (refer to FIG. 2), an image processing unit 3 connected to the camera 2, and a control unit 4 for warning of being asleep-at-the-wheel.

The control unit 4 for warning of being asleep-at-the-wheel is connected to the image processing unit 3 through a communication line, to permit transfer of signals therebetween.

Figure 2:
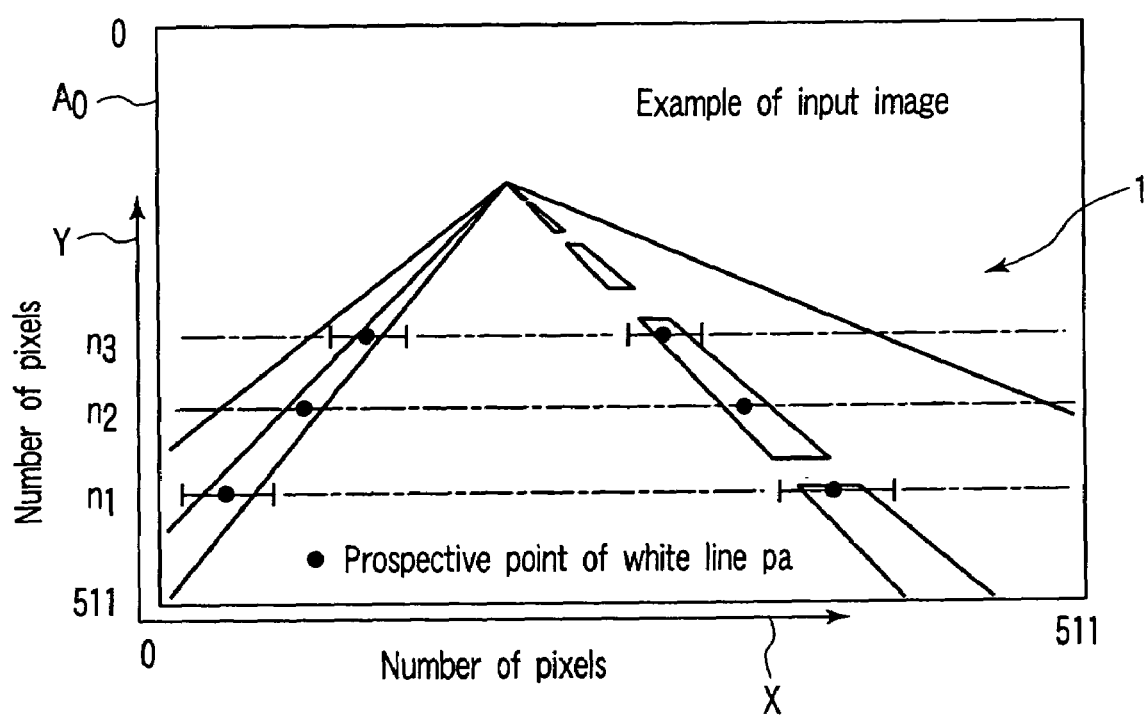
FIG. 2 is a front view of a check image that is processed by a running position detector of FIG. 1.
Figure 3:
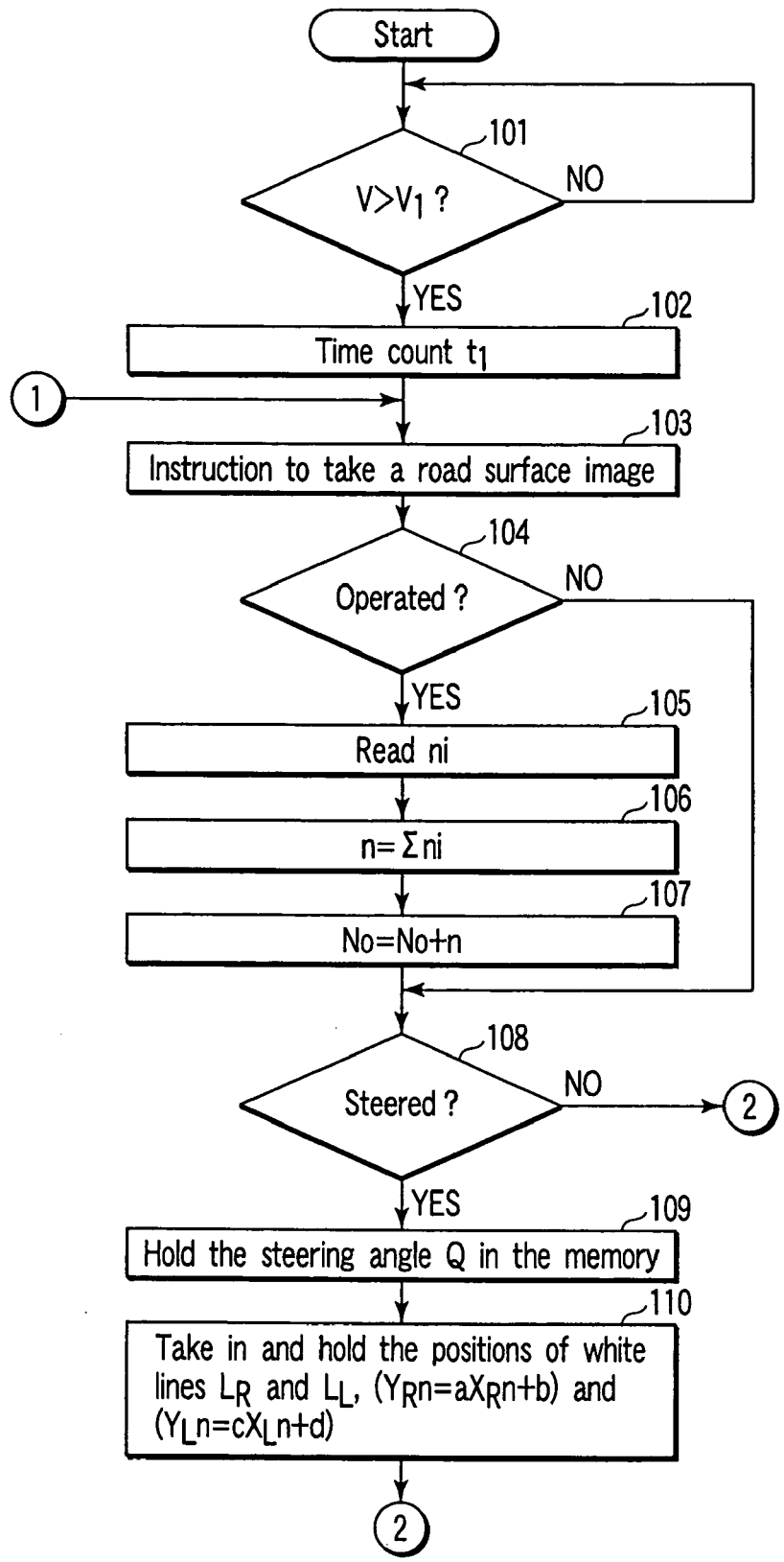
FIG. 3 is a flowchart of control processing performed by the asleep-at-the-wheel warning apparatus of FIG. 1.
Figure 4:
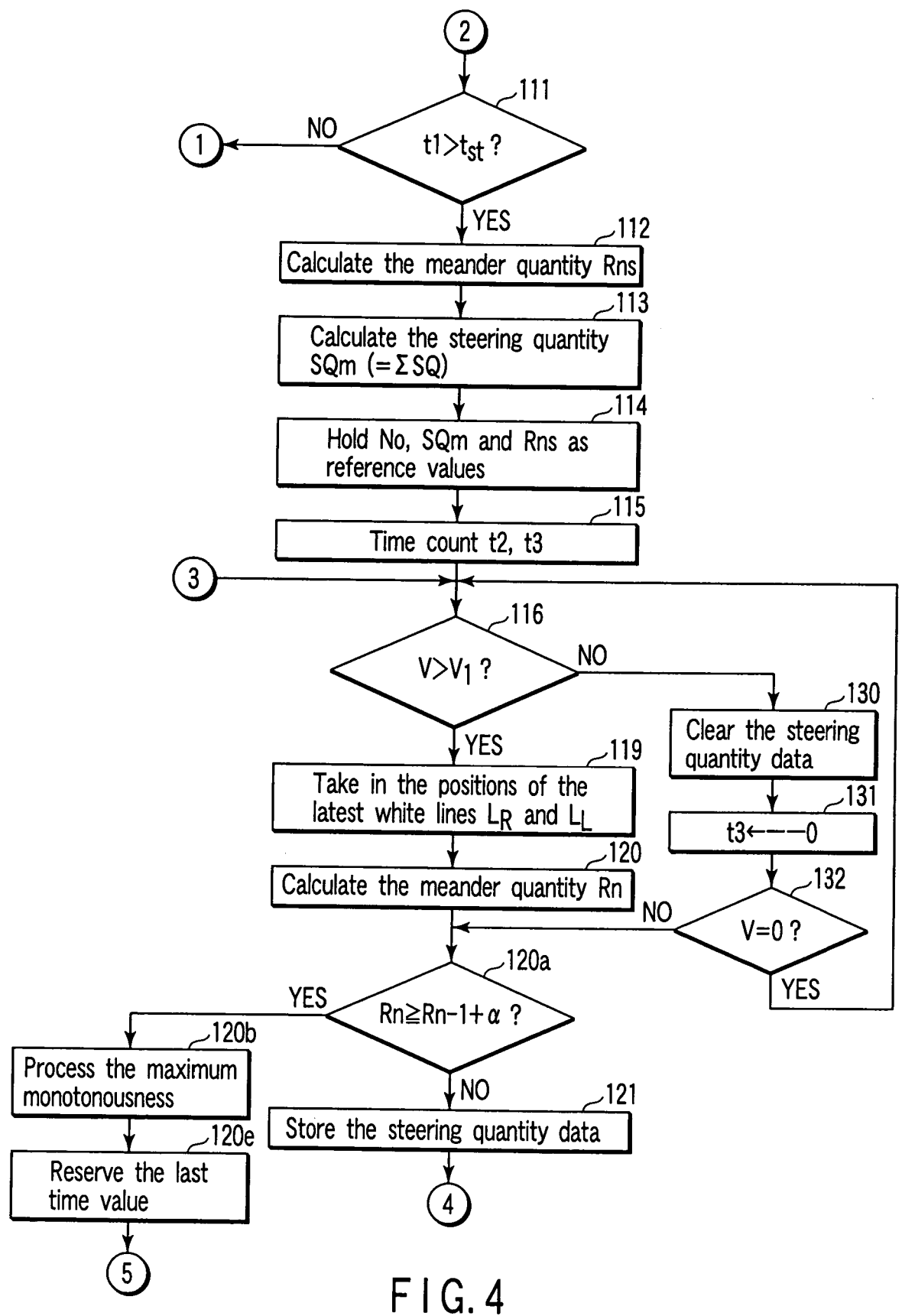
FIG. 4 is a flowchart of control processing performed by the asleep-at-the-wheel warning apparatus of FIG. 1.
Figure 5:
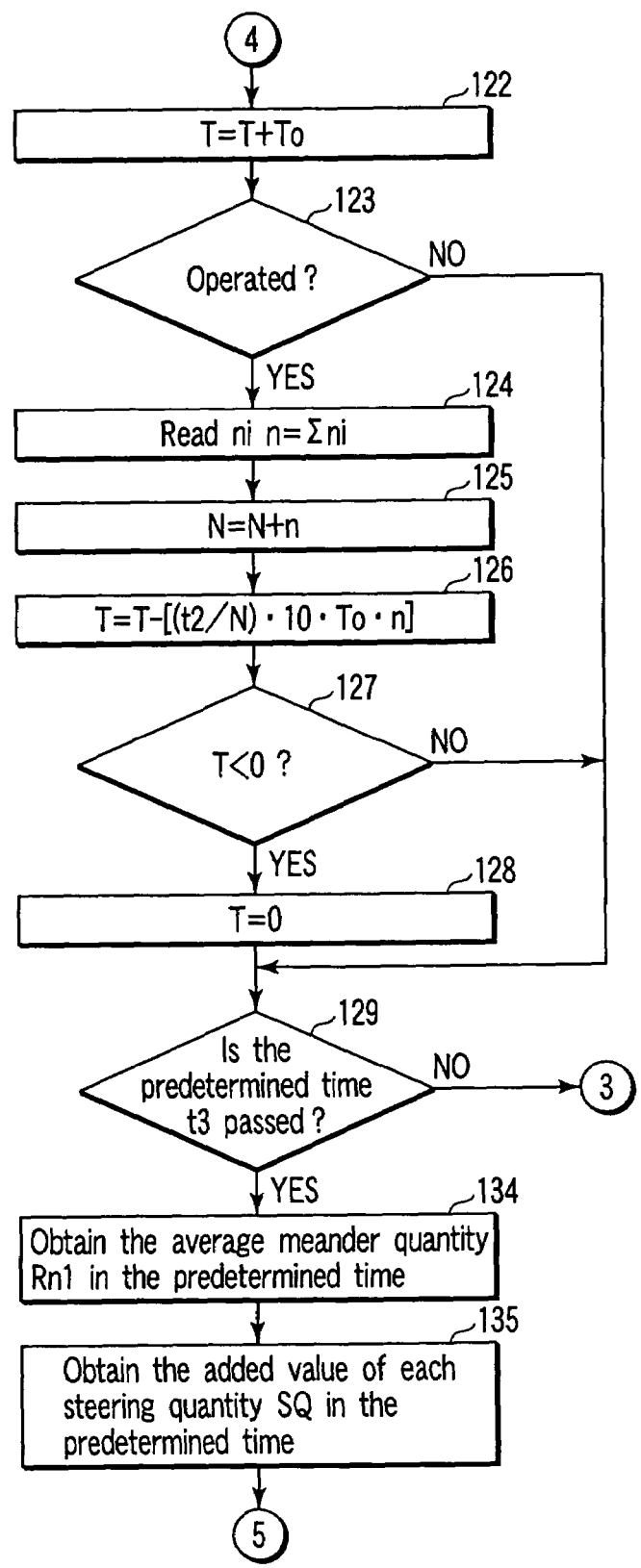
FIG. 5 is a flowchart of control processing performed by the asleep-at-the-wheel warning apparatus of FIG. 1.
Figure 6:
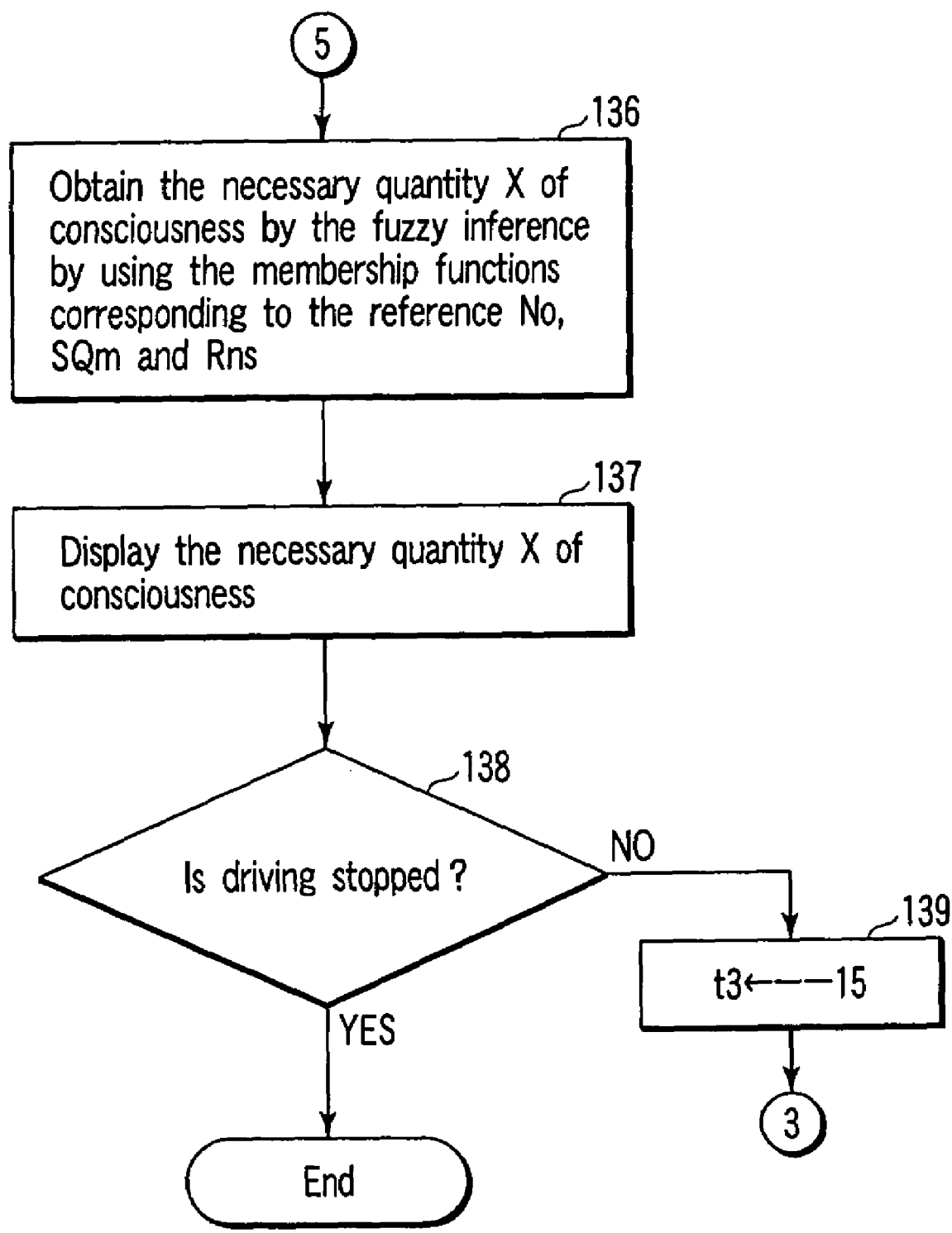
FIG. 6 is a flowchart of control processing performed by the asleep-at-the-wheel warning apparatus of FIG. 1.

The camera 2 is provided to capture an image of a front road surface within an image $A_0$ shown in FIG. 2. The road surface image from the camera 2 is input to the image processing unit 3.

The image processing unit 3 has a known image processing function, particularly a function as an image data memory C1 and image processing means C2, which are a part of a running position detection means C.

The image data memory C1 selectively stores the road surface image from the camera 2 at every predetermined time as a still check image P1, and files sequentially the image data of the check image P1 (the image $A_0$ is one of the check image) in the latest check image data storing area in a predetermined image memory.

The image processing means C2 sequentially executes an image processing process.

Namely, the image processing means reads the latest check image P1 (refer to FIG. 2) from the latest check image data storing area at appropriate timing. Then, the image processing means performs various operations based on the data of the latest check image P1, determines the positions $(Y_{Rn}=aX_{Rn}+b)$, $(Y_{Ln}=cX_{Ln}+d)$ on the X/Y coordinates of white lines $L_R$ and $L_L$, and outputs them to the control unit 4 for warning of being asleep-at-the-wheel.

The control unit 4 for warning of being asleep-at-the-wheel has a control unit 8, which is connected to various means for detecting operations of each operation means of an automobile, such as, a vehicle speed sensor 10, a brake operation detection means 11, an exhaust brake detection means 12, a gear-shift operation detection means 13, a winker operation detection means 14, a wiper operation detection means 15, a light operation detection means 16, and a steering angle sensor 17.

The vehicle speed sensor 10 detects the vehicle speed V of the automobile. The brake operation detection means 11 detects the operation of the brake pedal. The exhaust brake detection means 12 detects the operation of the exhaust brake switch. The gear-shift operation detection means 13 detects the operation of a gear-shift lever. The winker operation detection means 14 detects the operation of the winker lever. The wiper operation detection means 15 detects the operation of the wiper switch. The light operation detection means 16 detects the operation of the light switch. The steering angle sensor 17 detects the steering angle Q of the steering wheel.

The control unit 8 is further connected to a timer 17, counters 19 and 20, an indicator 6, and a memory 21.

The timer 18 is used to count various times during operation and control cycle time.

The memory 21 is a means for storing a weighting value ni (i=1, 2, 3 . . . ) with respect to the operations of each operation means. The weighting value ni is previously stored corresponding to each operation means. The memory 21 also stores other various setting values.

The weighting value ni is set also for the other operations considering cancellation of monotonousness.

The essential part of the control unit 4 for warning of being asleep-at-the-wheel is composed of a microcomputer. The unit has a function of a meander quantity calculator C3 as a running position detector C, and has functions as a driving operation detector A, a steering operation detector B, a fuzzy inference unit D to infer the degree of consciousness of the driver, and a reference value setting unit E, which will be described later.

The meander quantity calculator C3 forming a part of the running position detector C acquires the position data of white lines $L_R$, $L_L$ in the X-Y coordinates, $(Y_{Rn}=aX_{Rn}+b)$ and $(Y_{Ln}=cX_{Ln}+d)$ by predetermined times from the image processing unit 3, and calculates the displacement of each white image in the X-direction, that is, a standard deviation, as a meander quantity Rn. This meander quantity is calculated at a third predetermined time shorter than a second predetermined time, for example, every one minute, and stored in the memory 21. The meander quantity calculated this time is called Rn, and the meander quantity calculated the last time (namely, one minute before) is called Rn−1.

The reference value setting unit E has a function to store the total number of operation times, average value SQm of steering quantity SQ, and average value Rns of meander quantity Rn in the memory 21 as reference values at the end of initial driving operation after passing a certain time from the start of driving.

The driving operation detector A functions after the initial driving operation time passes, and corrects monotonousness T.

The steering operation detector B functions after the initial driving operation time passes, and obtains the steering quantity SQ at that predetermined time based on the steering angle Q at the latest unit time (one minute at present).

In this case, the difference (qi+1−qi) between the last time value qi and this time value qi+1 of the steering angle data is sequentially calculated every ¹⁄₁₀ second (dt), that is the control cycle time, and the added value of the unit time (the time width from qi to qn) is calculated as a steering value SQ.

The fuzzy inference unit D functions after the initial driving operation time passes, and infers the degree of driver's consciousness based on the member-ship functions corresponding to the monotonousness T from the driving operation detector A, the steering quantity SQ from the steering operation detector B, and the meander quantity Rn from the running position detector C.

The fuzzy inference unit D updates the degree of consciousness by executing the judgment cycle every one minute, but the data used for each judgment cycle is taken in the time range of 5 minutes immediately before each judgment cycle, and the data range is sequentially taken in by displacing one minute.

Next, explanation will be given of the function of the above configuration with reference to the flowcharts of FIG. 3 to FIG. 6.

When the ignition is turned on and the engine is started, the camera 2, image processing unit 3 and control unit 4 for warning of being asleep-at-the-wheel are actuated as a system, and the detected vehicle speed V of the vehicle speed sensor 10 is monitored by the control unit 8 (step 101).

When the vehicle speed V exceeds a certain value V1 (Yes in step 101), the timer 18 starts counting the initial operation time t1 (sec) (step 102), and a road surface capture instruction is output to the camera 2 and image processing unit 3. Then the image processing unit 3 goes into the process described later.

As a certain value V1, an expressway, which is monotonous for the driver is assumed, and the value is set to 60 to 70 km, for example.

A driver performs various operations during driving. They include operation of the accelerator, brake pedal, exhaust brake switch, gear-shift lever, winker lever, wiper switch, light switch and steering wheel.

When at least one of these operations except steering is executed (Yes in step 104), the weighting value ni predetermined for that operation is read from the memory 21 (step 105).

The read weighting value ni is added by the counter 19 considering the case that the same operation is performed (step 106), and the added value n is held as the total number of operation times during the initial driving operation (step 107).

$$n=\Sigma n i$$

$$N_0 = N_0 + n$$

When the steering wheel is operated, the steering angle Q is detected by the steering angle sensor 17. When the steering wheel is operated (Yes in step 108), the steering quantity SQ is obtained by the following equation (1) based on the detected steering angle Q, and the steering quantity is sequentially stored in the memory 21 (step 109).

$$SQ = \sum_{i=1}^{n-1} \text{ABS}(q_{i+1} - qi) \quad (1)$$

In step 110, the positions of white lines $L_R$, $L_L$ in the X-Y coordinates, $(Y_{Rn}=aX_{Rn}+b)$ and $(Y_{Ln}=cX_{Ln}+d)$ are sequentially taken from the image processing unit 3 during the initial driving operation time t1, and stored in the memory 21.

When the initial driving operation time $t_1$ exceeds a predetermined time $ts_1$ (e.g., 15 minutes) (step 111), the initial driving operation is finished.

In contrast, the image processing unit 3 goes into the fuzzy inference of white line at a certain timing of initial driving time after a point of time receiving a road surface capture instruction. The image processing unit calculates the data of each prospective point of white lines pa on each line $n_1$, $n_2$, $n_3$ along the method of least squares, determines the positions of white lines $L_R$ and $L_L$ in the X-Y coordinate, $(Y_{Rn}=aX_{Rn}+b)$ and $(Y_{Ln}=cX_{Ln}+d)$, and outputs theses values to the control unit 8.

When the initial driving operation is judged finished in step 111 of the main routine and step 112 is reached, the image processing unit sequentially calculates the X-coordinates of each white line $(X_R n1, X_L n1)$, $(X_R n2, X_L n2)$ and $(X_R n3, X_L n3)$ from the position data of the white lines $L_R$ and $L_L$, $(Y_{Rn}=aX_{Rn}+b)$ and $(Y_{Ln}=cX_{Ln}+d)$ for the predetermined times, and calculates the displacement of each white line image in the X-direction, that is, the standard deviation of an individual driver in the initial driving operation as the meander quantity Rns. As described above, the meander quantity Rns is calculated from the driving operation data of individual driver level in the initial driving time immediately after the start of driving with no fear of being asleep-at-the-wheel.

When step S113 is reached, the image processing unit obtains the steering quantity SQ based on the steering angle Q data stored in the memory 21. The steering quantity SQ is read out, and the added value SQm of the steering quantity at the initial driving operation is calculated.

The total number of operation times in the initial driving operation counted by the counter 19, the steering quantity (reference value) SQm in the initial driving operation, and the meander quantity Rns in the initial driving operation are held in the memory 21 as a reference value (step 114).

In this way, the driving operation data of individual driver level is taken in during the initial driving operation for a certain time $t_{si}$.

After the start of initial driving operation, the timer 18 starts counting the driving time t2 and consciousness judging time $t_3$ in step 115.

When the vehicle speed V exceeds the certain value V1 (Yes in step 116), the processing advances to step 119 and step 120. In these steps, the latest white line positions $(Y_{Rn}=aX_{Rn}+b)$ and $(Y_{Ln}=cX_{Ln}+d)$ are taken in from the image processing unit 3, and the meander quantity Rn, which is the displacement between the X-coordinate $(X_{Rn1}, X_{Ln1})$, $(X_{Rn2}, X_{Ln2})$, $(X_{Rn3}, X_{Ln3})$ of this time white lines and the X-coordinate of last time white lines, is calculated and stored in the memory 21. Then, whether the calculated meander quantity Rn is larger than the last time meander quantity Rn−1+predetermined value α is judged (step 120a).

If YES in step 120a, the monotonousness T is corrected to a maximum level, for example (step 120b). Thereafter, the processing is advanced to step 136 described later, and shifted to a step to obtain the degree of consciousness by the fuzzy inference. As described above, if the meander quantity Rn calculated this time at every one minute is larger than the meander quantity Rn−1+predetermined value α calculated last time, a driver is considered to suddenly become drowsy and lose consciousness, and the meander quantity is suddenly increased. Thus, the monotonousness is set to maximum, and the degree of consciousness is obtained by the fuzzy inference.

If NO in step 120a, the steering quantity SQ is obtained in step 121 by the equation (1) based on the steering angle Q data (($q_{i+1}$−qi)value) detected by the steering angle sensor 17, and the steering quantity data is stored in the memory 21.

Further, a certain value $T_0$ is added up by the counter 19, and the monotonousness T is obtained (step 122).

$$T=T+T_0$$

Addition of the certain value $T_0$ is repeated at every 1/10 second, that is, the control cycle time.

When at least any one operation except steering is executed during driving (Yes in step 123), the weighting value ni predetermined for that operation is read out from the memory 21 and added (step 124).

The added value n is added by the counter 19 as the total number of operation times N during driving (step 125).

$$n=\Sigma n i$$

$$N=N+n$$

The driving time t2 is divided by the total number of operation times N, and the average value [=t2/N] of the time between operations after the initial driving operation is obtained.

The average value of the time elapsed is multiplied by the monotonousness increment (=10·$T_0$) per second, and further multiplied by the added value n of the weighting value to be read out, thereby obtaining the monotonousness cancellation quantity [=(t$_2$/N)·10·$T_0$·n] based on the operation at the present time (step 126).

The sum of the counter 19 is subtracted by the monotonousness cancellation quantity (step 127), and the monotonousness T is corrected.

$$T=T-[(t_2/N)\cdot 10 \cdot T_0 \cdot n]$$

Therefore, the monotonousness T is continuously increased if no operation is performed, and decreased by the quantity corresponding to an operation each time an operation is performed.

When the monotonousness T becomes a negative value (Yes in step 127), the monotonousness T is corrected to zero (step 128).

Summation of the coefficient of monotonousness T, steering quantity SQ and meander quantity Rn is repeated until the consciousness judging time $t_3$ reaches the second predetermined time (step 129).

If the vehicle speed V is decreased to be lower than the certain value $V_1$ (No in step 116), the steering quantity SQ stored in the memory 21 is cleared (step 130).

At the same time, the consciousness judging time $t_3$ is cleared and returned to zero (step 131). The vehicle speed V is decreased to zero (Yes in step 132). However, in this case, the monotonousness T and X-coordinate of the last time white line are held.

When the consciousness judging time $t_3$ exceeds the second predetermined time (e.g., 5 minutes)(Yes in step 129), the average value $R_{n1}$ of the meander quantity $R_n$, which is the displacement of the X-coordinate of the white line images ($Y_{Rn}=aX_{Rn}+b$) and ($Y_{Ln}=cX_{Ln}+d$) stored within that predetermined time, is obtained (step 134). Namely, the average value Rn1 of the meander quantity Rn for 5 minutes is obtained.

Similarly, based on the steering angle Qn data stored within the predetermined time, each steering angle at every control cycle in the latest predetermined time is added, and the steering quantity SQ ($=\Sigma Qn$) is stored in the memory 21 (step 135).

When reaching step 136, the consciousness X is inferred.

First, the membership functions concerning the meander quantity Rs, monotonousness T and steering quantity SQ stored in the memory 21 are accessed. The monotonousness T is connected by increasing to a maximum value, for example, because the consciousness may be suddenly decreased if the meander quantity Rn calculated this time is larger than the meander quantity Rn−1+predetermined value α calculated one minute before as described by using step 120b. The membership functions are basically determined as being preset according to each reference obtained by the initial driving operation (average meander quantity Rns, monotonousness T, meander quantity SQm, total number of operation times NO) and the total number of operation times N obtained after the initial driving time passes. The membership functions and fuzzy control are common, and explanation will be omitted.

Unless the driving operation is stopped, the consciousness judging time $t_3$ is forcibly set to 60 seconds (step 139), step 116 is resumed, and the system stopped by the stop of driving.

Figure 1:
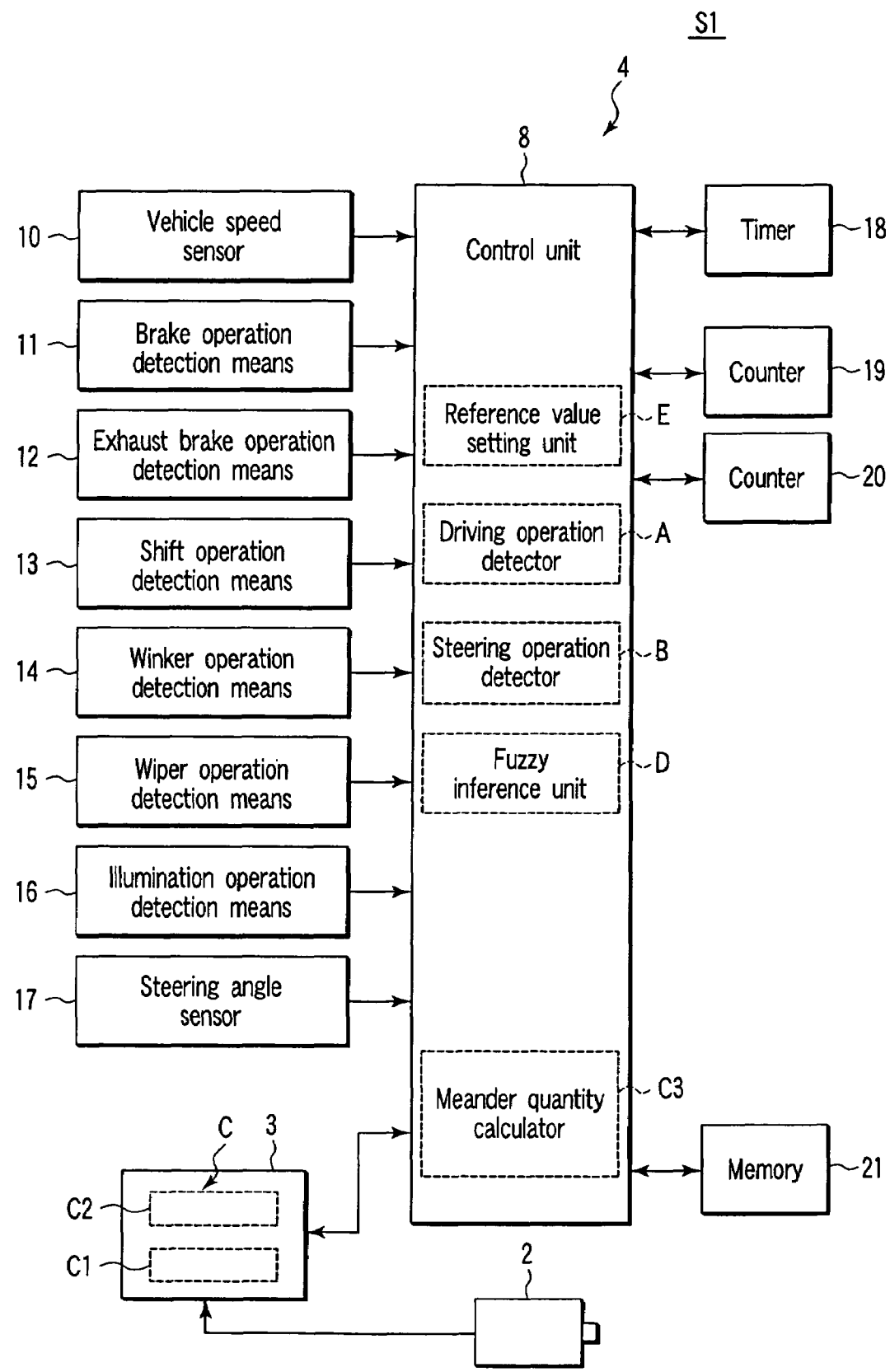
FIG. 1 is a block schematic diagram of an asleep-at-the-wheel warning apparatus as a first embodiment of a consciousness judging apparatus according to the present invention.
Figure 7:
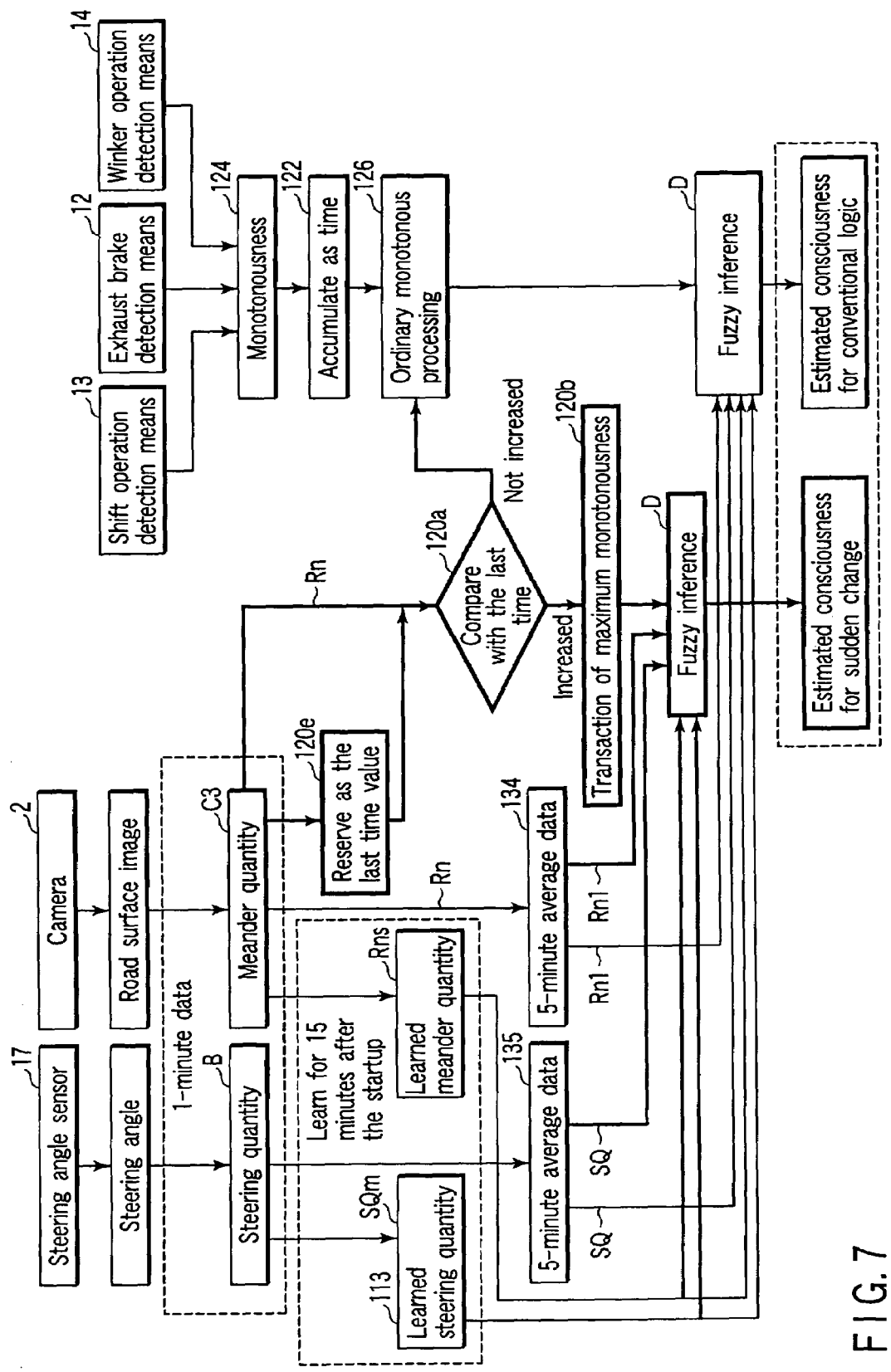
FIG. 7 is a view showing the configuration of the first embodiment.

Next, explanation will be given on the operation of the first embodiment with reference to FIG. 7 and FIG. 8. In FIG. 7, the parts drawn by a thick line indicates the present invention, and reference numerals indicate the step numbers in FIG. 1 and flowchart. The parts drawn by a thin line indicate the control used conventionally.

First, the steering angle Q detected by the steering angle sensor 17 is input to the steering operation detector B. The steering operation detector B obtains the steering quantity SQ by averaging the steering angle by a third predetermined time (e.g., 1 minute) that is shorter than a second predetermined time described later. The road surface image captured by the camera 2 is input to the meander quantity calculator C3. The meander quantity calculator C3 calculates the meander quantity Rn from the displacement of the X-coordinate of the white line of the road surface image every third predetermined time. The latest meander quantity Rn calculated this time is assumed to be Rn, and the meander quantity Rn−1 calculated last time or one minute before is assumed to be Rn−1.

The steering quantity SQ obtained every one minute by the steering operation detector B is learned in the above-mentioned first predetermined time (e.g., 15 minutes). As a result, a learned steering quantity SQm is obtained (step 113). Further, the meander quantity Rn calculated every one minute by the meander quantity calculator C3 is also learned in the first predetermined time after the vehicle is driven off. As a result, a learned meander quantity Rns is obtained.

The steering quantity SQ obtained every one minute by the steering operation detector B is averaged at every second predetermined time (e.g., 5 minutes), and the steering quantity SQ is obtained (step 135).

Further, the meander quantity Rn obtained every one minute by the meander quantity calculator C3 is averaged at every the second predetermined time, and the meander quantity Rn1 is obtained (step 134).

The meander quantity Rn calculated every one minute by the meander quantity calculator C3 is compared with the meander quantity Rn−1 calculated last time (one minute before) (step 120a). If Rn≦Rn−1+predetermined value α as a result of the comparison, this is judged to be a sudden drop of concentration and the monotonousness to be input to the fuzzy inference unit D is increased (e.g., a maximum value) (step 120b). Here, the last time meander quantity Rn−1 is stored in a predetermined memory (step 120e).

The above-mentioned learned steering quantity SQm, learned meander quantity Rns, steering quantity SQ, meander quantity Rn1 and maximum monotonousness are input to the fuzzy inference unit D. The fuzzy inference unit D infers the consciousness X every one minute.

The monotonousness T can be obtained based on the above-mentioned operations performed by a driver. However, here, the monotonousness T is obtained by weighing each of the clutch operation detected by the gear-shift operation detection means 13, exhaust brake switch operation detected by the exhaust brake operation detection means 12, and winker lever operation detected by the winker operation detection means 14 (step 124). The number of operation times is stored (step 122).

If NO in step 120a, ordinary monotonousness processing is performed (step 127). Namely, the monotonousness is set to $T=T=-[t_2/N] \cdot 10 \cdot T_0 \cdot n]$. The monotonousness T is continuously increased if any of the clutch operation detected by the gear-shift operation detection means 13, exhaust brake switch operation detected by the exhaust brake operation detection means 12, and winker lever operation detected by the winker operation detection means 14 is not performed, and decreased by the quantity corresponding to the operation each time the operation is performed.

The above-mentioned learned steering quantity SQm, learned meander quantity Rns, steering quantity SQ, meander quantity Rn1 and maximum monotonousness are input to the fuzzy inference unit D. The fuzzy inference unit D infers the consciousness X at every one minute.

Consider the case that the meander quantity Rn calculated every one minute by the meander quantity calculator C3 is changed as shown in FIG. 8A, for example.

As shown in FIG. 8A, the meander quantity Rn is changed a little up to 21 minutes after the vehicle is started, but the difference between the meander quantity Rn of this time and the meander quantity Rn−1 of last time does not become larger than a predetermined value α. Therefore, the monotonousness T to be input to the fuzzy inference unit D is the monotonousness T processed in step 126. Namely, the monotonousness T processed in step 126 is continuously increased as shown in FIG. 8B, and held at the value α little lower than the intermediate value.

Thus, the consciousness X inferred by the fuzzy inference unit D becomes 2 or lower as shown in FIG. 8C. The consciousness level is 0–5 as shown in FIG. 8C. This means that as the consciousness X increases, the concentration decreases.

When 22 minutes passes after the vehicle is driven off, the difference between the meander quantity Rn of this time (namely, $22^{nd}$ minute) and the meander quantity Rn−1 of last time (namely, $21^{st}$ minute) becomes larger than the predetermined value α, as shown in FIG. 8A. (The state with the high meander quantity Rn is continued up to 32 minutes as shown in the drawing.) Thus, the monotonousness T is increased to a maximum value, for example, in step 120a.

The meander quantity Rn−1 of last time (namely, $21^{st}$ minute), when the difference between the meander quantity Rn of this time and the meander quantity Rn−1 of last time is judged larger than the predetermined value α, is stored in the predetermined memory (120e). The next meander quantity Rn is compared with the meander quantity of the $21^{st}$ minute stored in the predetermined memory.

Therefore, the meander quantity Rn is larger than the meander quantity of the $21^{st}$ minute stored in the predetermined memory by the predetermined value α or more before 32 minutes, and a maximum value of the monotonousness is continuously input to the fuzzy inference unit D.

If the monotonousness T is set to a maximum value as described above, the consciousness X inferred by the fuzzy inference unit D is suddenly increased as shown in FIG. 8C, and the consciousness X can be judged to be lowered.

If an warning unit is actuated when the consciousness X is increased to be larger than the predetermined value, a warning can be given even if a driver's consciousness is extremely lowered.

Namely, the monotonousness T calculated in step 126 is increased on and after 21 minutes.

The consciousness X is stayed near 3 even if the consciousness X is inferred by the fuzzy inference unit D based on the monotonousness T, as described above. Therefore, a warning is not given.

As described above, in the first embodiment, the monotonousness T can be increased to a maximum value if the meander quantity is suddenly increased and the difference between the meander quantity Rn and the meander quantity Rn−1 of last time (namely, one minute before) is judged to be larger than the predetermined value α. Thus, even if the meander quantity is suddenly increased, it can be reflected to the consciousness X.

Figure 9:
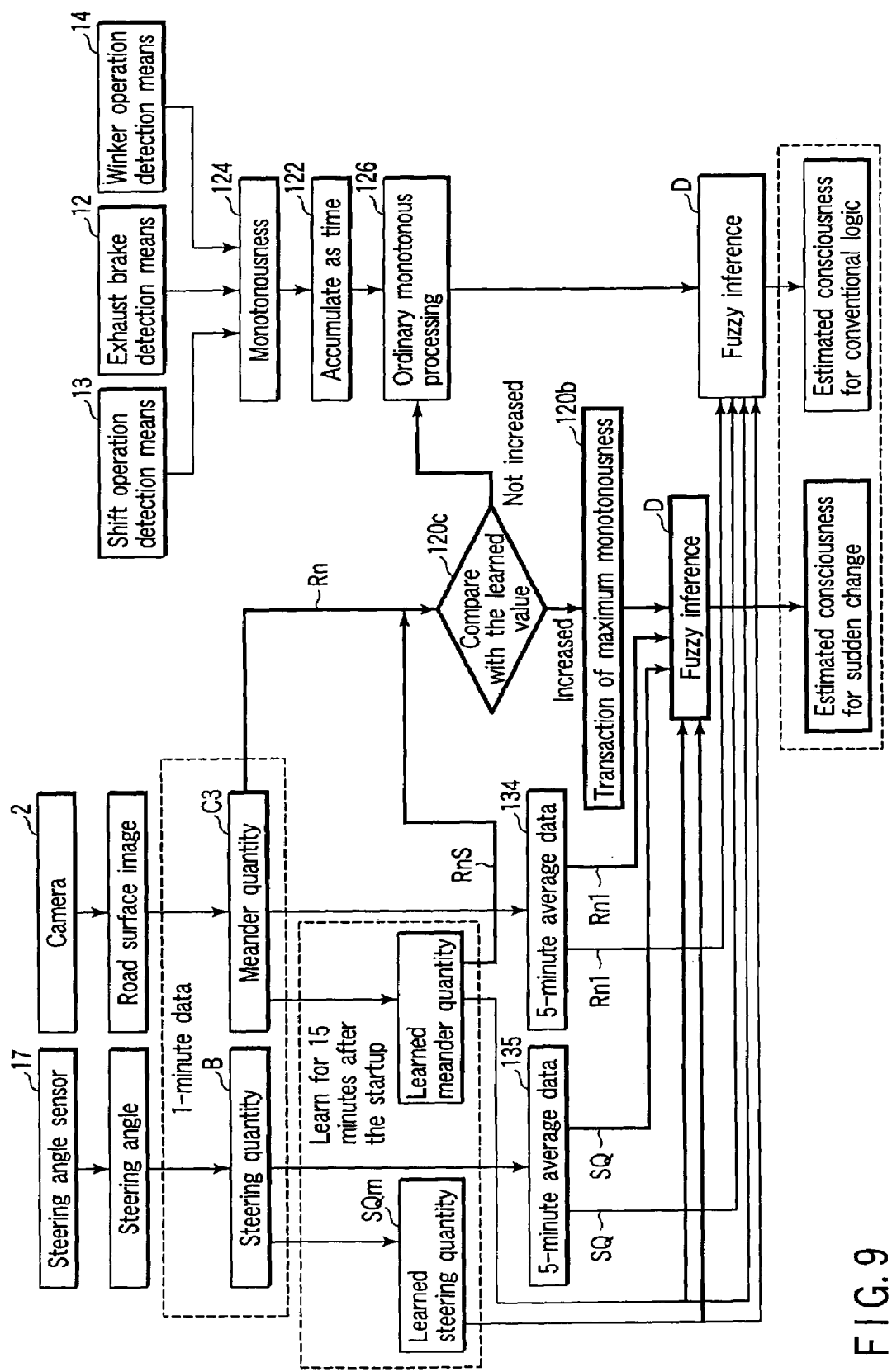
FIG. 9 is a view showing the configuration of a second embodiment of the present invention.

Next, explanation will be given on a second embodiment of the present invention with reference to the block diagram of FIG. 9. In the second embodiment, when the difference between the meander quantity Rn calculated every one minute by the meander quantity calculator C3 and the learned meander quantity Rns obtained by learning for a certain time, for example, 15 minutes after the startup, is larger than the predetermined value α, the monotonousness T is increased to a maximum value, for example (step 120c). The judgment in step 120c is different from step S120a of the first embodiment, but the other operations are the same as the first embodiment. Detailed explanation will be omitted.

Therefore, according to the second embodiment, when the difference between the meander quantity Rn calculated every one minute by the meander quantity calculator C3 and the learned meander quantity Rns obtained by learning for 15 minutes after the startup is larger than the predetermined value α, the monotonousness T to be input to the fuzzy inference unit D is set to a maximum value, "47". Thus, even if the meander quantity is suddenly increased, it can be reflected to the consciousness X.

Figure 10:
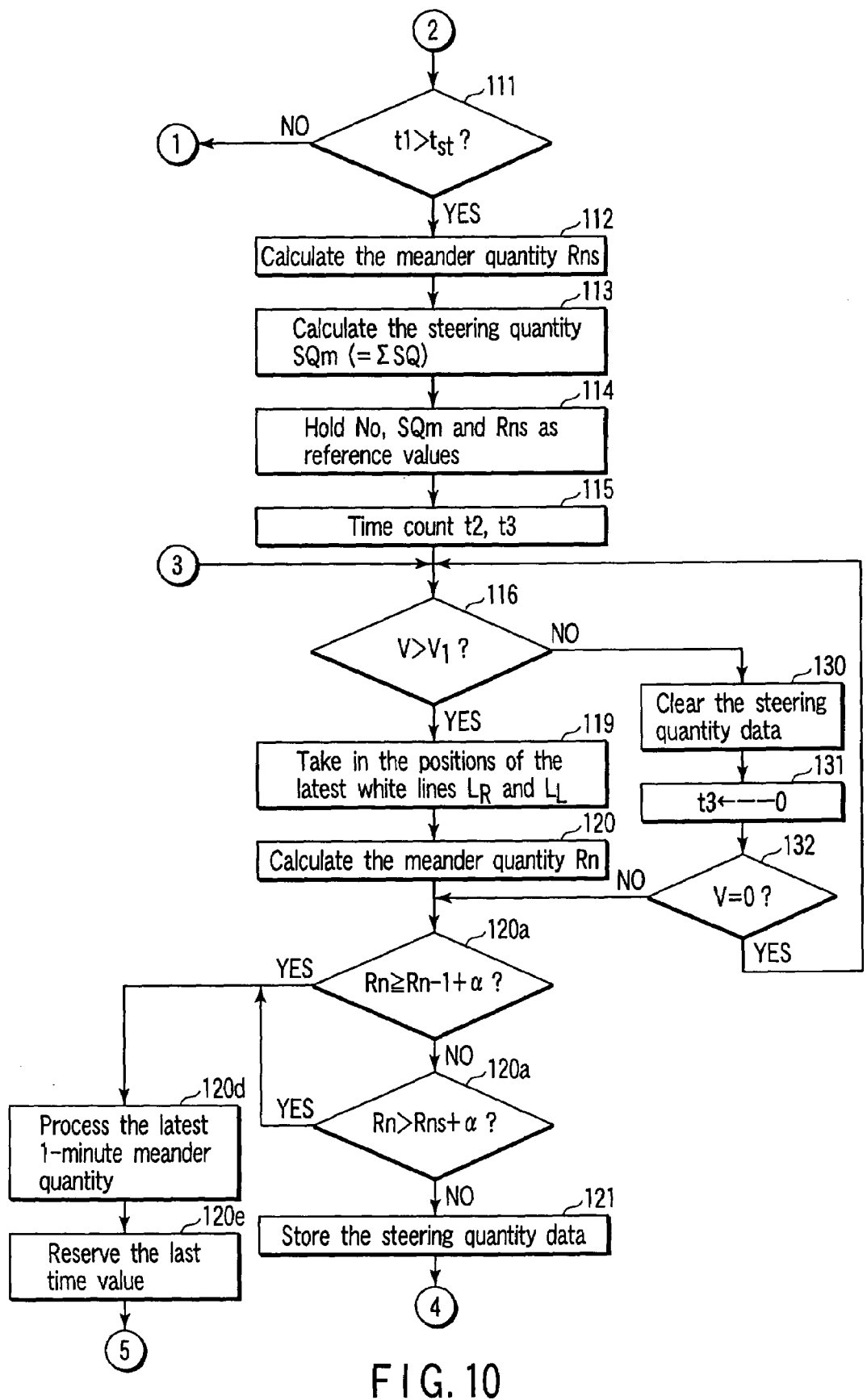
FIG. 10 is a flowchart showing the characteristics of a third embodiment of the present invention.

Next, explanation will be given on a third embodiment of the present invention with reference to the flowchart of FIG. 10 and block diagram of FIG. 11. In the third embodiment, the flowchart other than the flowchart of FIG. 10 is different from the first embodiment. In the third embodiment, the meander quantity Rn calculated every one minute by the meander quantity calculator C3 is compared with the meander quantity Rn−1 calculated last time (namely, one minute before). When Rn≧Rn−1+α as a result of the comparison (step 120a), or when the difference between the meander quantity Rn calculated at every one minute by the meander quantity calculator C3 and the learned meander quantity Rns obtained by learning for the predetermined time, for example, 15 minutes after the startup is larger than the predetermined value α (YES in step 120c), the latest one minute meander quantity Rn calculated at every one minute by the meander quantity calculator C3 is input to the fuzzy inference unit D.

Figure 11:
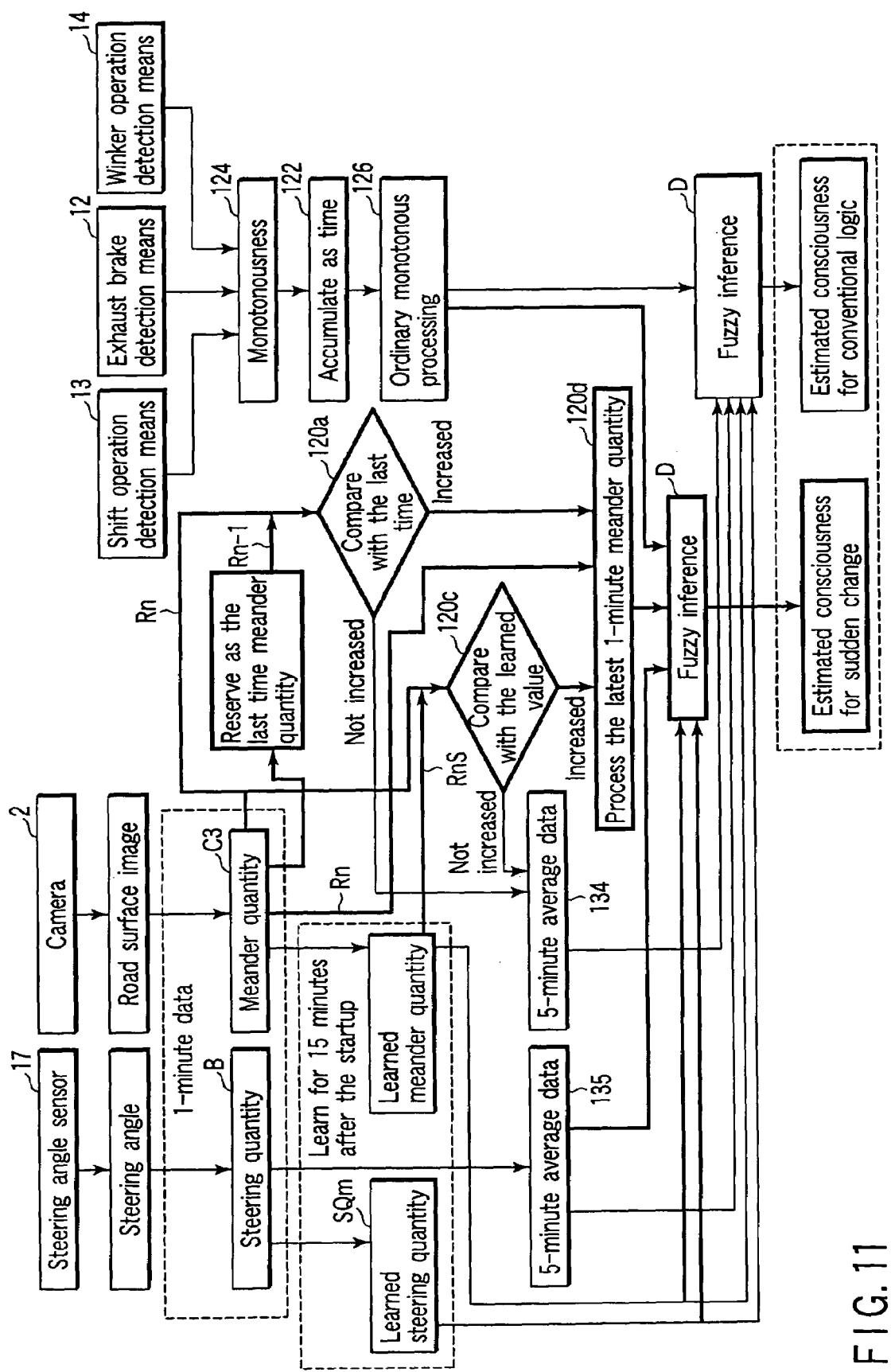
FIG. 11 is a view showing the configuration of the third embodiment.

FIG. 11 is a block diagram for explaining the third embodiment. In FIG. 11, the meander quantity Rn calculated at every one minute by the meander quantity calculator C3 is input to the latest one minute meander quantity processor 120d. The results of the Judgments in steps 120a and 120c are also input to the latest one minute meander quantity processor 120d. Step 120a is the same as FIG. 7, and step 120c is the same as FIG. 9. Detailed description will be omitted.

In this third embodiment, when YES is judged in step 120a or 120c, the latest one minute meander quantity is inputted to the fuzzy inference unit D. As the latest one minute meander quantity reflects the current meander quantity, it can be reflected to the consciousness X in the fuzzy inference unit D even if the meander quantity is suddenly changed.

In the above embodiment, When the difference between the meander quantity Rn of this time and the meander quantity Rn−1 of last time is judged larger than the predetermined value α, a maximum monotonousness is to be input to the fuzzy inference unit D. But, the degree of the monotonousness T can be set appropriately.

Further, in the above embodiment, the first predetermined time is 15 minutes, the second predetermined time is 5 minutes, and the third predetermined time is one minute. But, they are not limited to these values, and can be set appropriately.

As explained above, according to the present invention, when the meander quantities are detected and the difference between the meander quantities becomes larger than the predetermined value α, the monotonousness T to be input to the fuzzy inference unit can be increased, or the latest one minute meander quantity can be input to the fuzzy inference unit. Thus, even if the meander quantity is suddenly increased, it can be reflected to the consciousness X.

Further, according to the present invention, even if a driver's consciousness is suddenly lowered, the consciousness reflecting the sudden change can be inferred. Thus, even if the consciousness is suddenly changed, a warning can be given to meet the sudden change.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A consciousness judging apparatus, which detects a vehicle driving state and judges consciousness of a driver, comprising:
a monotonousness detection section configured to obtain monotonousness;
an image pickup unit configured to capture an image of a road surface in the vehicle running direction;
a meander quantity detection section configured to detect the meander quantity based on the road surface image captured by the image pickup unit;
a correction section configured to correct and increase the monotonousness when the meander quantity detected this time by the meander quantity detection section is larger than the meander quantity detected last time by the meander quantity detection section by the value greater than a predetermined value; and
a fuzzy inference section configured to infer a driver's consciousness based on the monotonousness corrected by the correction section and meander quantity.

2. The consciousness judging apparatus according to claim 1, further comprising a steering quantity detection section configured to obtain a steering quantity from the vehicle steering angle, wherein the steering quantity obtained by the steering quantity detection section is input to the fuzzy inference section as input data.

3. The consciousness judging apparatus according to claim 1, wherein the monotonousness detection section detects monotonousness based on operations of clutch, exhaust brake and winker.

4. A consciousness judging apparatus, which detects a vehicle driving state and judges consciousness of a driver, comprising:
a monotonousness detection section configured to obtain monotonousness;
an image pickup unit configured to capture an image of a road surface in the vehicle running direction;
a meander quantity detection section configured to detect the meander quantity based on the road surface image captured by the image pickup unit;
a learned meander quantity calculation section configured to learn a meander quantity within a predetermined time and calculates a learned meander quantity;
a correction section configured to correct and increase the monotonousness when the meander quantity detected this time by the meander quantity detection section is larger than the leaned meander quantity by the value greater than a predetermined value; and
a fuzzy inference section configured to infer a driver's consciousness based on the monotonousness corrected by the correction section and meander quantity.

5. The consciousness judging apparatus according to claim 4, further comprising a steering quantity detection section configured to obtain a steering quantity from the vehicle steering angle, wherein the steering quantity obtained by the steering quantity detection section is input to the fuzzy inference section as input data.

6. The consciousness judging apparatus according to claim 4, wherein the monotonousness detection section detects monotonousness based on operations of clutch, exhaust brake and winker.

7. A consciousness judging apparatus, which detects a vehicle driving state and judges consciousness of a driver, comprising:
a monotonousness detection section configured to obtain monotonousness;
an image pickup unit configured to capture an image of a road surface in the vehicle running direction;
a meander quantity detection section configured to detect the meander quantity based on the road surface image captured by the image pickup unit;
a learned meander rate calculation section which learns a meander quantity within a first predetermined time, and calculates a learned meander quantity;
an average meander quantity detection section configured to obtain an average value of a meander quantity within a second predetermined time;
a fuzzy inference section configured to infer a driver's consciousness based on the monotonousness and meander quantity within a third predetermined time shorter than the second predetermined time, when the meander quantity detected this time by the meander quantity detection section is larger than the meander quantity detected last time by the meander quantity detection section by the value greater than a predetermined value, or when the meander quantity detected this time by the meander quantity detection section is larger than the leaned meander quantity detected by the learned meander quantity calculation section by the value greater than a predetermined value.

8. The consciousness judging apparatus according to claim 7, further comprising a steering quantity detection section configured to obtain a steering quantity from the vehicle steering angle, wherein the steering quantity obtained by the steering quantity detection section is input to the fuzzy inference section as input data.

9. The consciousness judging apparatus according to claim 8, wherein the input data within the third predetermined time is calculated based on the steering quantity and meander quantity, the learned data within the first predetermined time is calculated based on the data calculated within the third predetermined time, and the average data within the second predetermined time is calculated based on the average of the data calculated within the third predetermined time.

* * * * *